(12) United States Patent
Bubb et al.

(10) Patent No.: US 9,822,041 B2
(45) Date of Patent: Nov. 21, 2017

(54) CERAMIC HONEYCOMB BODIES INCLUDING COLD SET PLUGS

(71) Applicant: CORNING INCORPORATED, Corning, NY (US)

(72) Inventors: Keith Norman Bubb, Beaver Dams, NY (US); Anthony Joseph Cecce, Elmira, NY (US); Thomas Richard Chapman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/408,868

(22) Filed: Jan. 18, 2017

(65) Prior Publication Data

US 2017/0121231 A1    May 4, 2017

Related U.S. Application Data

(63) Continuation of application No. 13/307,876, filed on Nov. 30, 2011, now Pat. No. 9,579,688.

(51) Int. Cl.
| | | |
|---|---|---|
| C04B 38/00 | (2006.01) | |
| C04B 28/24 | (2006.01) | |
| B05D 7/22 | (2006.01) | |

(52) U.S. Cl.
CPC ............ *C04B 38/0012* (2013.01); *B05D 7/22* (2013.01); *C04B 28/24* (2013.01)

(58) Field of Classification Search
CPC .................................................. C04B 38/0012
USPC ........................................................ 428/117
See application file for complete search history.

(56) References Cited

U.S. PATENT DOCUMENTS

| | | | |
|---|---|---|---|
| 6,673,300 | B2 | 1/2004 | Allen et al. |
| 8,039,089 | B2 | 10/2011 | Yoshida |
| 8,092,624 | B2 | 1/2012 | Tomita et al. |
| 2005/0050845 | A1 | 3/2005 | Masukawa et al. |
| 2006/0213164 | A1* | 9/2006 | Hatano .............. B01D 46/0001 55/523 |
| 2006/0272306 | A1* | 12/2006 | Kirk ................... B01D 46/0001 55/523 |
| 2007/0039298 | A1 | 2/2007 | Tokumaru |
| 2009/0033005 | A1 | 2/2009 | Bookbinder et al. |
| 2009/0142499 | A1 | 6/2009 | Cecce et al. |
| 2009/0286041 | A1 | 11/2009 | Deneka et al. |
| 2010/0252497 | A1 | 10/2010 | Ellison et al. |
| 2012/0301664 | A1 | 11/2012 | Chapman et al. |

FOREIGN PATENT DOCUMENTS

| | | |
|---|---|---|
| CN | 2090425 U | 12/1991 |
| EP | 1707546 A1 | 10/2006 |
| EP | 1930061 A2 | 6/2008 |
| WO | 2009017642 A1 | 2/2009 |
| WO | 2009070249 A1 | 6/2009 |
| WO | 2010074711 A2 | 7/2010 |

OTHER PUBLICATIONS

Chinese Office Action & Search Report dated Jun. 25, 2015 relating to Chinese Patent Application No. CN201280067972.1.
Chinese Application No. 201280067972.1, dated May 9, 2016, "Notice on the Second Offce Action", 15 pages.
English Translation of JIS Handbook 35 Ceramics Table 1 for R6111; 2004; 2 pages.
English Translation of JIS Handbook 35 Ceramics Table 5 for R6001; 2004; 2 pages.
Patent Cooperation Treaty International Notification of Transmittal of the International Search Report and the Written Opinion of the International Searching Authority, international application No. PCT/US2012/067164; dated Jun. 18, 2013, 14 pages.
JP2014544900 Office Actiond dated Jan. 5, 2017, Japan Patent Office, 7 pages.

\* cited by examiner

*Primary Examiner* — William Phillip Fletcher, III
(74) *Attorney, Agent, or Firm* — Jakub M. Michna

(57) ABSTRACT

Various embodiments are directed to ceramic articles. The ceramic articles include a fired ceramic honeycomb body having a plurality of cell channels and at least one plug disposed in at least one cell channel of the fired ceramic honeycomb body. The at least one plug includes a refractory filler, an inorganic binder, and an organic binder. The refractory filler comprises particles having a $d_{50}$ in the range from about 10 μm to about 40 μm, and a $d_{90}$ less than about 110 μm.

19 Claims, 4 Drawing Sheets

CERAMIC HONEYCOMB BODIES INCLUDING COLD SET PLUGS

CROSS-REFERENCE TO RELATED APPLICATIONS

This application is a continuation of U.S. patent application Ser. No. 13/307,876, filed on Nov. 30, 2011, now U.S. Pat. No. 9,579,688 B2, the content of which is relied upon and incorporated herein by reference in its entirety, and the benefit of priority under 35 U.S.C. §120 is hereby claimed.

TECHNICAL FIELD

The disclosure relates to honeycomb ceramic bodies and methods of making the same. In various embodiments, the disclosure relates to fired ceramic honeycomb bodies comprising an unfired aqueous composition, for example in the form of a cold-set plug. In further embodiments, the disclosure relates to processes for preparing fired ceramic honeycomb bodies, comprising applying an unfired aqueous composition, as well as processes for making an unfired aqueous composition for use with fired honeycomb ceramic bodies, for example as a cold-set plug composition.

BACKGROUND

The production of honeycomb articles, such as, for example, diesel particulate filters, often involves the application of ceramic cements (also referred to as pastes or sealants) onto pre-formed honeycomb bodies. These cement compositions may be applied to the honeycomb body, for example to form plugs for the cell channels of the honeycomb, to form artificial skin (also known as "after-applied skin"), or to bond several smaller honeycomb segments together to make a larger honeycomb body.

Plugging of diesel particulate filters to force exhaust gas to flow through porous walls has historically been accomplished using one of two composition types. The first composition type is typically very similar to the raw material of the honeycomb body. For example, for a cordierite honeycomb filter, the first composition may include clay and talc, and firing to a temperature sufficient to convert the raw materials into cordierite. In various applications, this first composition type provides favorable rheology for plugging, due to the presence of clay and talc, which are platy raw materials (that is, flat and plate-like structures found in soils) with high surface charge. The second composition type may consist of pre-reacted, ground cordierite powder and both organic and inorganic binders. Without the inclusion of organic binders, the second composition type does not exhibit sufficient plasticity. Thus, to achieve favorable rheology for plugging, the second composition type is typically mixed with organic binder(s) (included for rheology) and then fired to about 1000° C. in order to remove those organic components and react the inorganic binders (included for structural strength after the organic components are burned off).

The second composition type has been modified to provide methods that do not require a firing process as described above. However, the second composition type still presents some challenges for commercialization, particularly in view of the rheological behavior of the composition which has been found to be prone to syneresis (that is, liquid separation from solids). For example, when the second composition type is used as a plugging application, the target plug depths often cannot be achieved because batch liquids wick into the porous ceramic walls and the cement dries out to a stiff state within a few millimeters. Although attempts have been made to modify the undesired behavior, to date the success has been limited.

One such attempted solution to try to improve flow in a cement batch has been to decrease particle size. However, decreasing particle size has been found to increase the level of voids and dimples in the plug material, which are typically considered undesirable for the plugging application. Another attempted solution for improving plug depth has been to increase the amounts of methylcellulose and/or water in the cement composition. However, this approach has also been found to increase voids and dimples in the plug material. Thus, a need still exists to find a composition, and method of making a composition that will exhibit acceptable rheology for application to ceramic honeycomb bodies, such as for use as a plug composition, while reducing voids and dimples in the plug.

SUMMARY

Disclosed herein in various embodiments are methods of making an aqueous composition that may be useful for application to a ceramic honeycomb body, for example as a cold-set plug composition, comprising preparing an aqueous composition comprising a refractory filler, an inorganic binder, and an organic binder, wherein the composition is not fired. In various embodiments, the refractory filler comprises particles having a $d_{50}$ ranging from about 10 μm to about 40 μm. In various exemplary embodiments, certain methods may further comprise forming a cold-set plug from the composition. In further exemplary embodiments, the ceramic honeycomb body to which the composition may be applied may be a fired ceramic honeycomb body.

Disclosed herein in further embodiments are methods of making a ceramic article, said methods comprising providing a ceramic honeycomb body having a plurality of cell channels, and applying an aqueous composition comprising a refractory filler, an inorganic binder, and an organic binder to the ceramic honeycomb body, for example to the cell channels, wherein the aqueous composition is not fired before or after application to the ceramic honeycomb body. In various embodiments, the refractory filler comprises particles having a $d_{50}$ ranging from about 10 μm to about 40 μm. In further exemplary embodiments, the ceramic honeycomb body to which the composition may be applied may be a fired ceramic honeycomb body.

Disclosed herein in yet further embodiments are ceramic articles comprising a ceramic honeycomb body having a plurality of cell channels and an unfired composition comprising a refractory filler, an inorganic binder, and an organic binder. In various embodiments the refractory filler comprises particles having a $d_{50}$ ranging from about 10 μm to about 40 μm. In various embodiments, the ceramic articles may be provided wherein the unfired composition is in the form of a cold-set plug. In further exemplary embodiments, the ceramic honeycomb body may be a fired ceramic honeycomb body.

Additional features and advantages of the invention will be set forth in the detailed description which follows, and in part will be readily apparent to those skilled in the art from the description or recognized by practicing the invention as described herein, including the detailed description which follows, the claims, and the drawings.

BRIEF DESCRIPTION OF THE DRAWINGS

The accompanying drawings are included to provide a further understanding of the invention, and are incorporated in and constitute a part of this specification. The drawings are not intended to be restrictive of the invention as claimed, but rather are provided to illustrate exemplary embodiments of the invention and, together with the description, serve to explain the principles of the invention.

DETAILED DESCRIPTION

Figure 1:
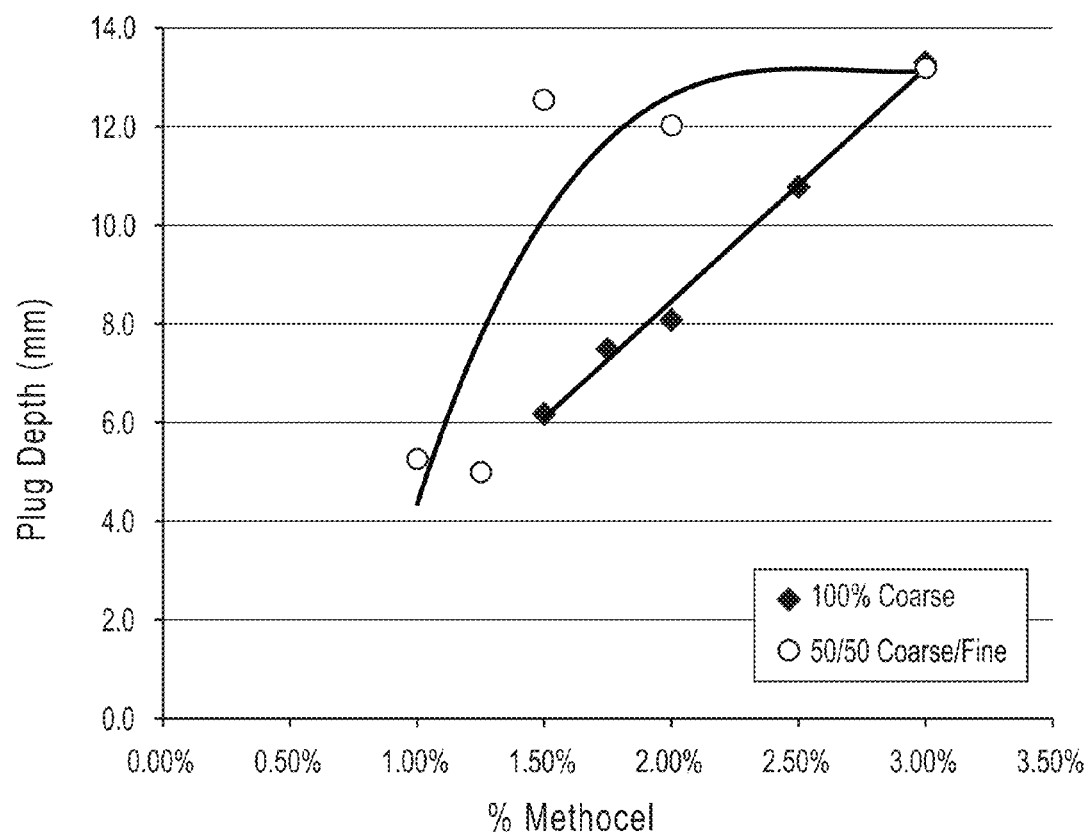
FIG. 1 is a graphic illustration showing plug depth achieved plotted against the percent level of methylcellulose (A4M Methocel) of two different cordierite blends, 100% coarse cordierite and 50/50 coarse/fine cordierite.

It is to be understood that both the foregoing general description and the following detailed description are exemplary and explanatory only, and are not restrictive of the invention as claimed. Other embodiments will be apparent to those skilled in the art from consideration of the specification and practice of the embodiments disclosed herein. It is intended that the specification and examples be considered as exemplary only, with the true scope and spirit of the invention being indicated by the claims.

It is also to be understood that, while in various embodiments described herein, steps of exemplary processes disclosed are recited in a particular order, it is intended that the disclosed process steps may be carried out in any order that one of skill in the art would understand would not significantly change the desired product.

Provided herein according to various embodiments are methods of making an aqueous composition that may be useful for application to a ceramic honeycomb body, for example as a cold-set plug composition. Also provided herein are methods of making a ceramic article, said methods comprising providing a ceramic honeycomb body having a plurality of cell channels and applying an aqueous composition, as well as ceramic articles comprising an aqueous composition. In various exemplary embodiments, the aqueous composition comprises at least one refractory filler, inorganic binder, and organic binder. In further exemplary embodiments, the aqueous composition is not fired.

As stated above, the aqueous composition comprises at least one refractory filler. In various embodiments, the at least one refractory filler comprises particles which are coarse. By "coarse," it is meant that the particles have a median particle size diameter, $d_{50}$ ranging from about 10 μm to about 40 μm, such as, for example, from about 15 μm to about 35 μm, from about 17 μm to about 25 μm, or from about 19 μm to about 22 μm. In at least some embodiments, the particles of the refractory filler also have a $d_{10}$ greater than about 2 μm, such as greater than about 3 μm, or greater than about 5 μm, and a $d_{90}$ less than about 110 μm.

The particles may be chosen from any particles known for making compositions for ceramic articles. By way of example, the particles of the refractory filler may be chosen from particles of cordierite, fused silica, silicates, silicon carbide, alumina, aluminum oxide, aluminum titanate, titania, magnesium, magnesium stabilized alumina, calcium stabilized alumina, zirconia, zirconium oxide, zirconia stabilized alumina, yttrium stabilized zirconia, calcium stabilized zirconia, zirconium mullite, mullite, spinel, magnesia, niobia, ceria, nitride, carbide, or any combination thereof.

The aqueous composition further comprises at least one inorganic binder. Any inorganic binder useful for making compositions for ceramic articles may be chosen. The inorganic binder may, in various embodiments, be colloidal, such as for example, colloidal silica. Other inorganic binders that may be used include those that are known, such as, for example, palygorskite, natural clay, bentonite, kaolin, or a cellulose-based inorganic binder. Non-limiting inorganic binders include, by way of example, colloidal silicas such as Ludox HS (HS-40 Ludox®), AS, and SK, available from W.R. Grace & Company. In at least certain exemplary embodiments, the inorganic binder as-added to the aqueous composition is not gelled. By "not gelled" it is meant that a separate and active gelling step is not undertaken, although it will be understood by those skilled in the art that some natural gelling may occur as the aqueous composition begins to dry.

The inorganic binder may be present in the aqueous composition as a superaddition, and may be added in an amount ranging from about 5% to about 20%, such as about 6% to about 16%, or about 7% to about 15%, by weight, relative to the total weight of the refractory filler in the composition.

In certain embodiments, the inorganic binder may contribute to the mechanical or rheological properties of the aqueous composition, such as the strength and viscosity of the composition, although this is not a required property. The improved strength and viscosity can, for example, improve the ability to withstand further processing steps and aid in plugging selected ends of a honeycomb body.

The aqueous composition further comprises at least one organic binder. Any organic binder useful for making compositions for ceramic articles may be chosen. Non-limiting organic binders may include, for example, cellulose materials, such as, methylcellulose; a wide variety of gums, such as, for example, Xanthan gum and actigum, and polyvinyl alcohol and derivatives thereof. It is contemplated that other organic binders that are known in the art may be suitable for use in the aqueous composition, such as, for example, hydroxypropylmethylcellulose, and other methylcellulose derivatives, and/or any combinations thereof. An exemplary methylcellulose binder is Methocel™ A4M, available from the Dow Chemical Company of Midland, Mich., USA.

In certain exemplary embodiments, the organic binder may be present in the aqueous composition as a superaddition, and may be added in an amount ranging from about 1.0% to about 5.0%, such as about 1.0% to about 3.0%, by weight of the refractory filler in the composition. In certain embodiments, the organic binder may be present in an amount of about 1.0%, such as about 2.0%, about 3.0%, about 4.0%, or about 5.0%, or more, by weight. It should be noted that other exemplary amounts in-between the given ranges, such as, for example, about 1.25%, about 1.50%, about 1.75%, and so on, are contemplated as well.

In certain embodiments, the organic binder may contribute to the rheological properties of the aqueous composition, such as the cohesion and plasticity of the composition, although this is not a required property. The improved cohesion and plasticity can, for example, improve the ability to shape the aqueous composition and aid in plugging selected ends of a honeycomb body.

Other components may optionally be added to the aqueous composition as well, including those which may assist in the blending and preparation of the aqueous composition prior to use, e.g. as a cold-set plug or prior to application to a structure such as a honeycomb structure or a filter structure. For example, a liquid vehicle may be included in the aqueous composition to assist in achieving the desired rheological properties. The liquid vehicle may be incorporated to provide a flowable or paste-like consistency to the aqueous compositions, for example, so that the aqueous composition can be applied to a honeycomb body as a paste or cement. According to certain embodiments, the liquid vehicle can be water, although it should be understood that other liquid vehicles exhibiting solvent action with respect to suitable organic binders can be used.

The liquid vehicle may be present as a superaddition, and may be added in an amount less than or equal to 60% by weight of the aqueous composition, and less than 40% by weight of the inorganic powder batch composition. In still other embodiments, the liquid vehicle is present as a superaddition in an amount that does not exceed 35% by weight of the aqueous composition, including, for example, a superaddition amount of from 25% to 35% by weight of the aqueous composition. It will be understood by those skilled in the art that it is desirable to minimize the amount of liquid vehicle while still obtaining a paste-like consistency capable of being forced into selected ends of a honeycomb structure. Minimization of liquid components in the aqueous composition may, in at least certain embodiments, lead to further reductions in undesired slumping, drying shrinkage, and crack formation during the drying process of the plug application.

Optionally, other additives may also be included in the aqueous composition, for example to aid in processing before, during, or after application to a honeycomb structure or in other forms of use, such as, by way of non-limiting example, pore formers.

To prepare the aqueous composition, the refractory filler, inorganic binder, and organic binder may be mixed together by conventional means. The rheological properties may be measured and adjusted according to the desired consistency, depending on the intended final application. For example, the rheology of the aqueous composition can further be controlled by modifying the amount of a liquid vehicle in relation to the viscosity of the organic binder. The liquid vehicle addition and the viscosity of the organic binder can be used to control the plugging forces required to plug ceramic honeycomb structures with the disclosed aqueous compositions, as well as to minimize undesirable slump and dimple formation.

In certain exemplary embodiments, the aqueous composition can be formed as a cold-set composition, which may be used as a plugging composition to plug one or more selected channels of a honeycomb body. The cold-set plug can be formed according to known procedures. According to various embodiments, the aqueous composition is not fired before or after the cold-set composition is applied to the ceramic body and/or the plug is formed. Without wishing to be bound, it is believed that this is possible due to the particular make-up of the composition, as described herein. Specifically, the combination of coarser particle size distributions with an increased organic binder levels has been found to permit the composition to achieve a desired rheology while maintaining integrity (e.g. for forming plugs for cell channels), without requiring a firing step.

In other embodiments, the disclosed aqueous composition is suitable for use in forming an after-applied surface coating or skin on at least one peripheral region of a honeycomb body or structure. Accordingly, portions of the outer surface of a formed honeycomb body can optionally be removed by known methods such as sanding, grinding, and the like, in order to obtain a resulting body having a desired shape. After the removal of material from the peripheral portion of the body, the disclosed aqueous composition can be applied to the peripheral portion or surface in order to form an after applied skin to the honeycomb body and to re-seal any honeycomb structure channels that may have been exposed or breached due to the removal of material. Once the skin coating has been applied, the applied aqueous composition can be used without firing, as described herein.

In still another embodiment, the disclosed composition can be applied as segment cement, for example to join two or more cellular honeycomb bodies. In various embodiments, the segment cement can be used to join two or more honeycomb bodies lengthwise or in an end to end relationship. Alternatively, the cements can be used to laterally join two or more cellular segments. For example, in some embodiments, it may be desirable to join two or more cellular honeycomb segments together laterally or in a side to side arrangement in order to form a larger cellular or honeycomb structure that may be too large for extrusion forming techniques described above. Once the segment cement has been applied to a honeycomb and the desired number of cellular segments has been joined, the segment composition can again used without firing as described herein.

In another aspect, the disclosure provides ceramic articles, e.g. particulate filters, comprising a ceramic honeycomb body having a plurality of cell channels, and an aqueous composition, optionally unfired, as well as methods for making ceramic articles. The methods comprise steps of providing a ceramic honeycomb body, optionally fired, having a plurality of cell channels, and applying an aqueous composition to the ceramic honeycomb body. The aqueous composition is as described above.

The fired ceramic honeycomb body can be chosen from those known and used in the art. By way of non-limiting example, in a honeycomb structure defining a plurality of cell channels bounded by porous cell channel walls, at least a portion of the plurality of cell channels can include plugs, wherein the plugs are formed from a cement composition, such as the aqueous composition disclosed herein. To plug selected channels, the disclosed aqueous composition can be forced into selected open cells of a desired porous ceramic honeycomb structure in the desired plugging pattern and to the desired depth, by one of several known plugging process methods. For example, the plugging can be effectuated by using a masking apparatus and process such as that disclosed and described in U.S. Pat. No. 6,673,300, the wall flow configuration disclosed and described in PCT Publication No. PCT/US2008/013009, and U.S. Publication No. 2009/0286041, incorporated by reference herein.

As can be seen from the above description, the disclosure solves at least some of the problems previously encountered with plugging cell channels of ceramic honeycomb bodies. The two conventional "knobs" identified for increasing plug depth capability are the addition of fine cordierite and increasing organic binder, e.g. Methocel. Both of these methods have shown increased voids and dimpling of the plugs. However, through the use of 100% coarse cordierite, in addition to higher levels of organic binder, e.g. Methocel, the desired plug depth, e.g. about 4 mm to about 12 mm, and plug quality, e.g. substantially free of voids and/or dimples, can be achieved.

The aqueous compositions described herein can exhibit advantageous rheological properties that render them well-suited for application to ceramic honeycomb bodies, including, for example, for use in forming end-plugged porous ceramic wall flow filters. The coarser particle size and increased binder level, as compared to previously known and tested cement compositions, are, at least in part, surprisingly and unexpectedly believed to be responsible for the improved properties. Further, a narrow-particle-size distribution coarse filler also aids in the prevention of voids and/or dimples. As a result, the aqueous composition enables cold-set plugs in the plug depth range of about 4 mm to about 12 mm, such as about 6 mm to about 10 mm. It should be noted, however, that plug depths outside these ranges are also possible, such as, for example, a plug depth of about 14 mm or higher.

FIG. 1 is a graphic illustration showing the plug depth achieved plotted against the percent level of methylcellulose (A4M Methocel) of two different cordierite blends, 100% coarse cordierite and 50/50 coarse/fine cordierite. The 50/50 coarse/fine curve appears to plateau after the 12 mm line; however, one of skill in the art will appreciate that the slope of the curve would have been steeper if the 13 mm plug depth was not the end-targeted plug depth to be measured.

Figure 2A:
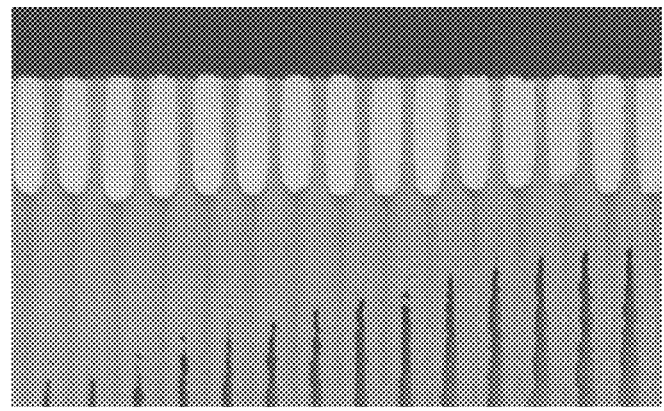
FIGS. 2A and 2B are photographic illustrations depicting plug quality and depth for differing particle size distributions of 100% coarse cordierite (FIG. 2A) and 50/50 blend coarse/fine cordierite (FIG. 2B) and differing methylcellulose binder levels of 1.25% A4M Methocel (FIG. 2A) and 1.50% A4M Methocel (FIG. 2B), with plug depth averaging about 5 mm (FIG. 2A) and about 12.5 mm (FIG. 2B).
Figure 2B:
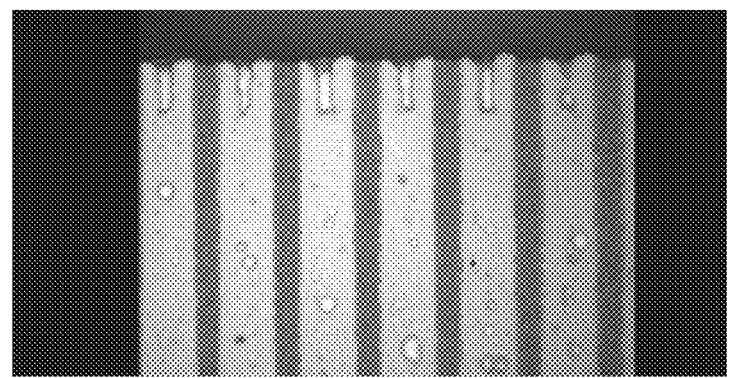

FIGS. 2A and 2B are photographic illustrations depicting plug quality for differing particle size distributions of 100% coarse cordierite (FIG. 2A) and 50/50 blend coarse/fine cordierite (FIG. 2B) and differing methylcellulose binder levels of 1.25% A4M Methocel (FIG. 2A) and 1.50% A4M Methocel (FIG. 2B), with plug depth averaging about 5 mm (FIG. 2A) and about 12.5 mm (FIG. 2B). The solid plugs (FIG. 2A) formed from an aqueous composition with 100% coarse cordierite and a methylcellulose level of 1.25% of A4M Methocel, have an average plug depth of about 5 mm. The solid plugs (FIG. 2B) formed from an aqueous composition with 50/50 coarse/fine cordierite and a methylcellulose level of 1.50% of A4M Methocel, have an average plug depth of about 12.5 mm, but exhibit dimpling. Dimples can be difficult to quantify so this is usually done by visual comparison as shown in these figures. For example, there is visibly less dimpling in FIG. 3A than in FIG. 3B. This corresponds to the composition make-up, including the methylcellulose type and level as well as the cordierite blend. Dimpling is believed to be due to the drying of the part, such as the ceramic honeycomb body, and involves shrinkage of the part. Thus, by increasing the particle size, the shrinkage can be decreased as well as the overall movement of the composition in the channel or pore, resulting in fewer dimples.

However, additional liquid vehicle or water can be added to adjust the viscosity of the organic binder and the consistency of the composition. This should be counterintuitive to those skilled in the art, who would expect that these two properties would be coordinated and adjusted together to improve plug integrity and increase plug depth with favorable rheology.

Figure 3A:
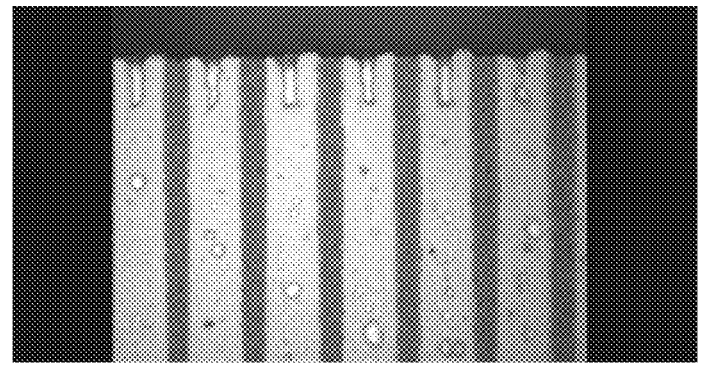
FIGS. 3A and 3B are photographic illustrations depicting plug quality and depth for differing particle size distributions of 50/50 blend coarse/fine cordierite (FIG. 3A) and 100% coarse cordierite (FIG. 3B), at the same methylcellulose binder levels of 1.50% A4M Methocel, with plug depth averaging about 12.5 mm (FIG. 3A) and about 6.18 mm (FIG. 3B).
Figure 3B:
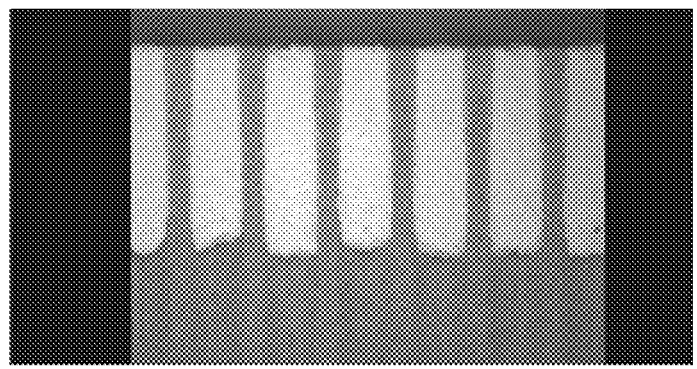

Thus, in FIGS. 3A and 3B the typical plug quality for differing particle size distributions of 50/50 blend coarse/fine cordierite (FIG. 3A) and 100% coarse cordierite (FIG. 3B), both at the same methylcellulose level of 1.50% A4M Methocel is shown. By changing the 50/50 coarse/fine blend of cordierite to 100% coarse the dimples and voids are eliminated using the same 1.5% A4M Methocel as shown in the visual comparison between FIGS. 3A and 3B. Although the plug quality is much better with the 100% coarse cordierite, the plug depth capability is reduced by about half to 6.18 mm (FIG. 3B). The average plug depth in FIG. 3A is about 12.5 mm. However, with the 100% coarse cordierite the A4M Methocel level can be increased much more before dimples are seen. Unlike the 50/50 cordierite blend that has a step change in plug depth capability, when plotted graphically, the 100% coarse cordierite has a linear slope as the Methocel level is increased (as seen in the graph of FIG. 1 depicting the plug depth achieved plotted against the percent level of methylcellulose (A4M Methocel) of 100% coarse cordierite).

Figure 4A:
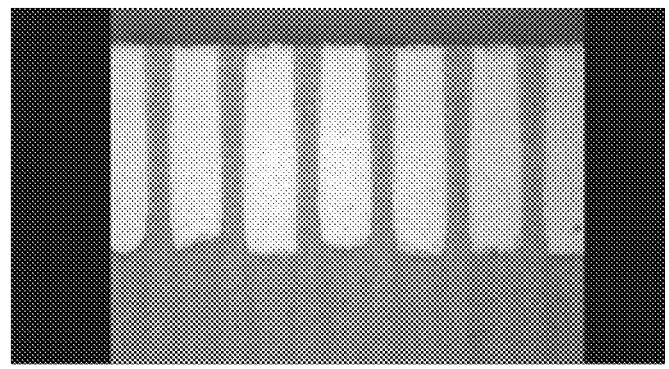
FIGS. 4A and 4B are photographic illustrations showing the typical plug quality for the same particle size distribution of 100% coarse cordierite at differing methylcellulose levels of 1.50% A4M Methocel (FIG. 4A) and 3.0% A4M Methocel (FIG. 4B), with plug depth averaging about 6.8 mm (FIG. 4A) and about 13.3 mm (FIG. 4B).
Figure 4B:
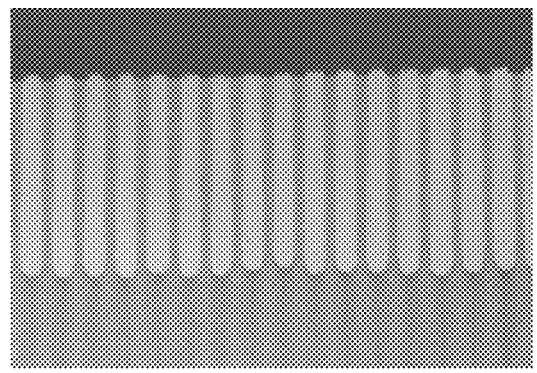

The 100% coarse cordierite composition even at 3.0% A4M Methocel (FIG. 4B) does not exhibit the heavy dimpling and voids that the 50/50 blend exhibited at 1.50% A4M Methocel (FIG. 4A), as depicted in FIGS. 4A and 4B. The aqueous composition with 3.0% A4M Methocel also achieves the plug depth capability needed with the 100% coarse cordierite. The achieved average plug depths depicted here are about 6.8 mm (FIG. 4A) and about 13.3 mm (FIG. 4B).

As used herein, the singular forms "a," "an," and "the" include plural referents unless specifically indicated to the contrary. Thus, for example, reference to "a cold-set plug" includes embodiments having one or more cold-set plugs.

As used herein, a "wt. %" or "weight percent" or "percent by weight" of a component is based on the total weight of the aqueous composition in which the component is included, unless specifically stated to the contrary (e.g. when the component is stated to be added as a superaddition relative to the weight % of the refractory filler).

As used herein, "prevention of voids and/or dimples," "prevent voids and/or dimples," and similar language, is intended to refer to plugs, coatings, and other applications of compositions formed according to various embodiments described herein, that have no, or substantially no, voids or dimples, or that have reduced occurrences of voids or dimples relative to plugs, coatings, and other applications of compositions formed from previously known compositions.

As described herein, the particle diameters of all powders were measured by a laser diffraction technique, using a Microtrac particle size analyzer.

The values $d_{10}$ and $d_{50}$ are defined as the diameters at 10% and 50% of the cumulative particle size distribution, with $d_{10} < d_{50}$. Thus, $d_{50}$ is the median particle diameter, and $d_{10}$ is the particle diameter at which 10% of the particles are finer. The value of $d_{90}$ is the particle diameter for which 90% of the particles are finer in diameter; thus $d_{10} < d_{50} < d_{90}$.

As used herein, the terms "unfired," "not fired," and the like, mean that the aqueous composition is not fired after it is prepared, either before or after application to the ceramic honeycomb body, including but not limited to before or after a plug is formed.

As used herein with respect to the aqueous composition, the terms "apply," "applied," and the like, are meant to indicate that the composition is brought into contact with the ceramic body, such as, for example, in a coating composition or by plugging the cells of the honeycomb body with the composition. By way of example, the aqueous compositions can be applied to honeycomb bodies as a plugging cement composition, segment cement, or even as an after-applied artificial skin or coating.

As used herein, "after-applied" skin or coating refers to a non co-extruded skin or surface coating on a peripheral region of an extruded honeycomb body. For example, when honeycomb structures are extrusion formed, dried, and fired, the resulting body may need to be resized or shaped in order to comply with desired size and shape tolerances for a given end use application.

As used herein, a "superaddition" refers to a weight percent of a component, such as for example, an organic binder, liquid vehicle, additive, or pore former, based upon and relative to 100 weight percent of the aqueous composition.

As used herein, the term "optional" or "optionally" means that the subsequently described event or circumstance mayor may not occur, and that the description includes instances where said event or circumstance occurs and instances where it does not.

Unless otherwise indicated, all numbers used in the specification and claims are to be understood as being modified in all instances by the term "about," whether or not so stated. By way of example, "100% coarse cordierite" is understood to include cordierite that is "about 100% coarse." It should also be understood that the precise numerical values used in the specification and claims form additional embodiments of the invention, and are intended to include any ranges which can be narrowed to any two end points disclosed within the exemplary values provided. Efforts have been made to ensure the accuracy of the numerical values disclosed herein. Any measured numerical value, however, can inherently contain certain errors resulting from the standard deviation found in its respective measuring technique.

EXAMPLES

To further illustrate the principles of the disclosure, the following examples are set forth to provide those of ordinary skill in the art with a complete disclosure and description of the aqueous composition, ceramic filter and the related methods. These examples are intended only to be exemplary and are not intended to limit the scope of the invention. Unless otherwise indicated, parts are by weight, temperature is ° C. or is at ambient temperature, and pressure is at or near atmospheric.

The aqueous composition in the following examples was prepared and applied to a porous ceramic honeycomb structure comprised of a microcracked porous ceramic material. Exemplary amounts of the raw materials used to make the aqueous composition, as well as those of a known control cement composition, are set for in Table 1 below.

TABLE 1

| Ingredient | Inventive Composition | Control Composition |
|---|---|---|
| Cordierite Powder (Coarse) | 100% | 50% |
| Cordierite Powder (Fine) | | 50% |
| Colloidal Silica* | 25 wt. % | 25 wt. % |
| Organic Binder* | 2.5 wt. % | 1 wt. % |
| Water* | 33 wt. % | 25 wt. % |

*Indicates the weight percentage for the batch ingredient was calculated as a superaddition relative to the combined total weight of the powdered cordierite.

The two compositions were then evaluated to determine the rheological behavior and plug integrity based on substituting different cordierite blends for the batch ingredients. Exemplary compositions with different cordierite blends and the varying levels and types of organic binders that were used and evaluated are set forth in Table 2 below. The resultant plug depths for each of the different combinations in the exemplary compositions are also recorded. As is evident by the collected data, the average plug depth is generally increased with the combination of a higher methylcellulose level and a coarser particle size distribution is used.

TABLE 2

| Composition | Methylcellulose Type | Methylcellulose Level | Cordierite Blend | Plug depth (average) |
|---|---|---|---|---|
| PL289 | A4M | 1.00% | 50/50 | 5.3 |
| PC1 | A4M | 2.00% | 50/50 | 12.0 |
| PC2 | A4M | 3.00% | 50/50 | 13.2 |
| PC6 | A4M | 1.00% | 50/50 | 5.5 |
| PC7 | A4M | 2.00% | 50/50 | 13.6 |
| PC8 | A4M | 3.00% | 50/50 | 13.2 |
| CS25 | A4M | 1.50% | 50/50 | 12.6 |
| CS27 | A4M | 1.50% | 100 | 6.2 |
| CS28 | A4C | 4.00% | 100 | 11.0 |
| CS29 | A4C | 3.50% | 100 | 9.6 |
| CS30 | A4C | 3.25% | 100 | 8.7 |
| CS31 | A4M | 1.75% | 100 | 7.5 |
| CS32 | A4M | 3.00% | 100 | 13.3 |
| CS33 | F240 | 1.00% | 100 | 6.1 |
| CS34 | F240 | 3.00% | 100 | 14.0 |
| CS35 | A4M | 2.00% | 100 | 8.1 |
| CS36 | A4M | 2.50% | 100 | 10.8 |
| CS37 | F240 | 2.00% | 100 | 9.4 |
| CS38 | A4M | 1.25% | 50/50 | 5.0 |

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A ceramic article comprising:
 a fired ceramic honeycomb body having a plurality of cell channels; and
 an unfired composition comprising a refractory filler, an inorganic binder, and an organic binder;
 wherein the refractory filler comprises particles that have a $d_{50}$ in the range from about 10 μm to about 40 μm and a $d_{90}$ less than about 110 μm; and
 wherein the unfired composition is disposed in at least one cell channel of the fired ceramic honeycomb body in the form of at least one plug.

2. The ceramic article of claim 1, wherein the particles of the refractory filler have a $d_{10}$ greater than about 2 μm.

3. The ceramic article of claim 1 wherein the at least one plug has a depth in the cell channel ranging from about 4 mm to about 12 mm.

4. The ceramic article of claim 1 wherein the at least one plug has a depth in the cell channel ranging from about 6 mm to about 10 mm.

5. The ceramic article of claim 1, wherein the inorganic binder is a colloidal silica that is present in an amount ranging from about 5% to about 20% by weight as a superaddition.

6. The ceramic article of claim 1, wherein the organic binder is present in the composition in an amount ranging from about 1.0% to about 5.0% by weight.

7. The ceramic article of claim 1, wherein the organic binder is chosen from methylcellulose, Xanthan gum, actigum, and polyvinyl alcohol.

8. The ceramic article of claim 1, wherein the organic binder comprises methylcellulose.

9. The ceramic article of claim 1, wherein the particles of the refractory filler are chosen from particles of cordierite, fused silica, silicates, silica carbide, alumina, alumina titanate, mullite, zirconia, zirconia mullite, and spinel.

10. A ceramic article comprising:
   a fired ceramic honeycomb body having a plurality of cell channels; and
   at least one plug disposed in at least one cell channel of the fired ceramic honeycomb body, the at least one plug comprising a refractory filler, an inorganic binder, and an organic binder;
   wherein the refractory filler comprises particles having a $d_{50}$ in the range from about 10 μm to about 40 μm, and a $d_{90}$ less than about 110 μm.

11. The ceramic article of claim 10, wherein the particles of the refractory filler have a $d_{10}$ greater than about 2 μm.

12. The ceramic article of claim 10, wherein the ceramic article comprises a plurality of plugs.

13. The ceramic article of claim 10, wherein the at least one plug has a depth in the cell channel ranging from about 4 mm to about 12 mm.

14. The ceramic article of claim 10, wherein the at least one plug has a depth in the cell channel ranging from about 6 mm to about 10 mm.

15. The ceramic article of claim 10, wherein the inorganic binder is a colloidal silica that is present in an amount ranging from about 5% to about 20% by weight as a superaddition.

16. The ceramic article of claim 10, wherein the organic binder is present in the composition in an amount ranging from about 1.0% to about 5.0% by weight.

17. The ceramic article of claim 10, wherein the organic binder is chosen from methylcellulose, Xanthan gum, actigum, and polyvinyl alcohol.

18. The ceramic article of claim 10, wherein the organic binder comprises methylcellulose.

19. The ceramic article of claim 10, wherein the particles of the refractory filler are chosen from particles of cordierite, fused silica, silicates, silica carbide, alumina, alumina titanate, mullite, zirconia, zirconia mullite, and spinel.

* * * * *

UNITED STATES PATENT AND TRADEMARK OFFICE
CERTIFICATE OF CORRECTION

| | |
|---|---|
| PATENT NO. | : 9,822,041 B2 |
| APPLICATION NO. | : 15/408868 |
| DATED | : November 21, 2017 |
| INVENTOR(S) | : Keith Norman Bubb et al. |

It is certified that error appears in the above-identified patent and that said Letters Patent is hereby corrected as shown below:

On the Title Page

In Column 2, item (56), Other Publications, Line 4, delete "Offce" and insert -- Office --, therefor.

In the Claims

In Column 10, Line 58, Claim 3, delete "1" and insert -- 1, --, therefor.

In Column 10, Line 61, Claim 4, delete "1" and insert -- 1, --, therefor.

Signed and Sealed this
Twenty-ninth Day of October, 2024

Katherine Kelly Vidal
*Director of the United States Patent and Trademark Office*